No. 853,852. PATENTED MAY 14, 1907.
E. G. ADAMS.
INSURANCE SYSTEM.
APPLICATION FILED OCT. 22, 1906.

*Fig. 1.*

Policy No. 21215

The Postal Casualty Company
Lynchburg, Virginia

SCHEDULE OF INDEMNITIES:

This Contract is Limited as Above Stated.

The Postal Casualty Company

_____President.
_____Secretary.

Signature of Insured._____
Address._____

*Fig. 2.*

POST CARD

WRITE ONLY THE ADDRESS ON THIS SIDE

21215—C

Attest
Edward N. Sarton
L. B. Middleton

Inventor
E. G. Adams
by Spear, Middleton,
Donaldson & Spear.
Attys.

THE NORRIS PETERS CO., WASHINGTON, D. C.

UNITED STATES PATENT OFFICE.

EUGENE GRAVES ADAMS, OF LYNCHBURG, VIRGINIA, ASSIGNOR TO POSTAL INSURANCE CORPORATION, OF LYNCHBURG, VIRGINIA, A CORPORATION OF VIRGINIA.

INSURANCE SYSTEM.

No. 853,852.　　　　　　Specification of Letters Patent.　　　　　Patented May 14, 1907.

Application filed October 22, 1906. Serial No. 340,110.

*To all whom it may concern:*

Be it known that I, EUGENE GRAVES ADAMS, a citizen of the United States, residing at Lynchburg, Virginia, have invented certain new and useful Improvements in Insurance Systems, of which the following is a specification.

My invention hereinafter described consists in the combination of an accident insurance policy, and a postal card, both specially marked or imprinted for identification, and is designed to facilitate, both for the insurer and the insured, the business of accident insurance.

It is illustrated in the accompanying drawing, in which,

Figure 1 relates to the contract part of the combination, and Fig. 2 to the postal card part.

The accident insurance policy now largely in use in railway traveling, especially involves the use of a paper or card containing an agreement on the part of the insurer, accepted by the insured, and issued on payment of a specified sum of money, and running for a specified time from the date of issue and acceptance. This contract, when purchased, is usually sent by mail to the beneficiary or agent of the insured. As such accident insurance policies are bought mainly by persons traveling and run continuously from the date of issue, they are usually purchased at a point before starting on the journey, and are practically useless to the insured during the time in which he stops at places intermediate upon his way. Further, the number of places at which policies of the ordinary form are or may be issued, is greatly limited, and is largely limited to the more important railway stations.

The particular form of contract used in connection with my invention is not material, provided it be upon a sheet or folder of paper suitable to be handled and sold, in connection with a postal card, and contain the substance of an accident insurance policy imprinted thereon, and further, a distinct mark identifying or connecting it with the postal card, of which it forms a part.

A convenient, general form is indicated in Fig. 1 of the accompanying drawing, the parts of which, not shown, are hereinafter fully described. In substance it contains agreement on the part of the insurer to pay certain specified sum or sums of money, and the condition under which such sum or sums will be paid. It contains also blank spaces, indicated at *a* in Fig. 1, of suitable form and dimensions and properly located for the signature of the insurer and that of the insured, and preferably also for the address of the latter. It contains also a mark of identification corresponding with that on the postal card with which it is to be combined and sold. This is indicated at *b* in Fig. 1.

For a more full explanation a form of contract is herein given as follows: The contract specifies the name of the company and its location and the conditions under which the owner of the contract is insured. It states the schedule of indemnities and contains blanks for the signatures of the representative of the company and of the insured. There is a reference to the post-card forming a part of the contract, stating the things necessary to be done to place it in force and how the beneficiary is to be indicated and under what conditions the insured is to be the beneficiary. There is an explanation as to the company's liability; there is also a statement under the head of general conditions and this includes the limitations to the agent and states the number of contracts one person can hold at any one time.

The postal card, indicated in Fig. 2, may be the ordinary postal card of the General Post Office, or any equivalent thereof, though preferably the common "souvenir" postal card is used by me as more salable and more suitable. It must bear a mark preferably a numeral, indicated at *c* Fig. 2 corresponding with that upon the contract, whereby it is identified with the said contract, and made part thereof. It must also contain an explanatory statement that the card is issued in connection with the Accident Insurance System of the Postal Casualty Co., and that it is a part of the postal contract bearing the same number and issued to the sender. It also indicates that the person addressed is the beneficiary and that the contract is in force for 24 hours following the date of the first post mark thereon.

The policy and the post-card bear the same number. It will be understood that the substance and not the precise form of the imprint on either part of this combination is of the essence thereof. These parts (the card and contract) are made in form suitable for their proper combination and for sale as postal cards of the souvenir type are now so commonly sold. The purchaser buys as many as he desires, of the combined card and contract, and having signed as above explained, he directs the card to the beneficiary but need not mail it until he is about to start on his journey. He may buy one for each stage, of suitable length of time limit to cover, say, the first stage of the journey, and, having provided himself with as many as he needs, he may mail one at the beginning of each successive stage of that journey, and thus he does not pay insurance for time when it is not needed or uselessly. The mailing of the card inevitably involves the stamping thereon of the date and this is made the beginning of the term of the insurance. This also affords an opportunity of notifying his family or other beneficiary of his whereabouts and his remembrances.

The length of time for each particular contract may be 24 hours, or any other suited to the conditions.

I claim:

As an article of manufacture, a two part insurance policy consisting of a paper containing an insurance contract provided with suitably designated spaces for the signature of insurer and that of the insured combined with a postal card, both bearing a number or mark of identification, and the postal card bearing also printed reference to the contract paper and the beneficiary thereof, substantially as described.

In testimony whereof, I affix my signature in presence of two witnesses.

EUGENE GRAVES ADAMS.

Witnesses:
 C. S. Morris,
 R. H. Woolfolk, Jr.